(12) United States Patent
Ramelli

(10) Patent No.: US 6,461,164 B1
(45) Date of Patent: Oct. 8, 2002

(54) GRIPPING ELEMENT TOOTHBRUSH UTENSIL AND INSTRUCTIONAL KIT

(76) Inventor: Linda O. Ramelli, 6228 Caldwell Dr., New Orleans, LA (US) 70122

(*) Notice: Subject to any disclaimer, the term of this patent is extended or adjusted under 35 U.S.C. 154(b) by 0 days.

(21) Appl. No.: 09/993,879

(22) Filed: Nov. 15, 2001

(51) Int. Cl.[7] ............................................. G09B 19/00
(52) U.S. Cl. ...................... 434/263; 434/262; 434/433; 15/167.1; D4/104
(58) Field of Search ................. 434/127, 262, 434/263, 433; 401/118–120, 268; 206/362, 368, 361; 433/25–28

(56) References Cited

U.S. PATENT DOCUMENTS

| | | | |
|---|---|---|---|
| 4,007,548 A | * | 2/1977 | Cytanovich ................ 434/178 |
| 4,221,060 A | * | 9/1980 | Moskowitz et al. ........ 434/264 |
| 4,788,734 A | * | 12/1988 | Bauer ........................... 15/105 |
| 4,995,509 A | * | 2/1991 | Kornfeind ................... 206/205 |
| 5,194,030 A | * | 3/1993 | LeBoeuf et al. ............ 434/433 |
| 5,244,394 A | * | 9/1993 | Serabian-Musto .......... 434/262 |
| 5,269,420 A | * | 12/1993 | Harrison et al. ............ 206/349 |
| 5,438,726 A | * | 8/1995 | Leite ........................... 132/309 |
| 5,570,325 A | * | 10/1996 | Arpadi ........................ 222/192 |
| 5,786,749 A | * | 7/1998 | Johnson et al. ............. 206/362 |
| 5,806,127 A | | 9/1998 | Samoil et al. |
| 5,863,043 A | * | 1/1999 | Bitner ......................... 273/299 |
| 6,033,733 A | | 3/2000 | Samoil et al. |
| 6,102,203 A | | 8/2000 | Marro |
| 6,141,815 A | | 11/2000 | Harrison et al. |

OTHER PUBLICATIONS

Wilkins, Esther M., Clinical Practice of the Dental Hygienist, copyright 1994 and 1999, p. 750, Eighth Edition, Lippincott Williams & Wilkins.*

Esther M. Wilkins, Clinical Practice for the Dental Hygienist, 1999, p. 750, 8th Edition, Lippincott Williams & Wilkins.

* cited by examiner

Primary Examiner—Derris H. Banks
Assistant Examiner—George F Hufnagel
(74) Attorney, Agent, or Firm—Jones Walker

(57) ABSTRACT

A toothbrush kit and specially designed toothbrushes and dental utensils for use by children that teach children how to clean and care for their teeth. The toothbrushes and other dental utensils each include a gripping element formed near the middle of the handle of the toothbrush and dental utensils to provide for better gripping by a child's hand. The gripping element is in the shape of a sporting implement that also serves to make the use of the toothbrush more attractive and fun for the child. In addition to including the toothbrush and other dental utensils, the toothbrush kit also includes an instructional book for teaching the child dental health practices, a toothbrush stand for holding the toothbrushes and finger puppets ached to the stand that are animal characters from the instructional book.

26 Claims, 6 Drawing Sheets

GRIPPING ELEMENT TOOTHBRUSH UTENSIL AND INSTRUCTIONAL KIT

BACKGROUND OF THE INVENTION

1. Field of the Invention

The present invention relates to toothbrushes and other dental utensils for use by children and a toothbrush kit that teaches children how to clean and care for their teeth and about their dental health. More particularly, the toothbrushes and other dental utensils of the present invention each include a gripping element formed near the middle of the handle of the toothbrush and utensil to provide for better gripping by a child's hand. The gripping element is in the shape of a sporting implement that also serves to make the use of the toothbrush more attractive and fun for the child. In addition to including the toothbrush and other dental utensils, the toothbrush kit also includes an instructional book for teaching the child dental health practices, a toothbrush stand for holding the toothbrushes and finger puppets attached to the stand that are animal characters from the instructional book.

2. General Background

The use of specially designed toothbrushes to encourage children to take a greater interest in their dental health and to brush longer are known in the art. Some of these prior art toothbrush designs may provide a more grippable handle and others are themed in order to generate interest by the child by using sports figures and animal characters. These prior art designs, however, fail to incorporate the specially designed features of the toothbrush in the handle such that the design feature fits comfortably in the concave shape of the child's palm as it grips the handle. Also, such prior art toothbrushes fail to provide a themed instructional approach to dental health.

It is therefore an object of the present invention to provide a toothbrush or other dental utensil that has a sporting implement formed in the middle of the handle of the toothbrush or other dental utensil and shaped to fit comfortably in the palm of the child's hand. The sporting implement should be of interest to the child by being in the shape of objects liked by children. It is a further object of the present invention to provide for a themed instructional approach to dental health by providing an instructional book for reference by the child and the child's parents and finger puppets placed on the toothbrush stand to pique the fanciful interests of the child. The finger puppets are in the shape of themed animal characters that appear in the instructional book and guide the reader through the steps of brushing and dental health in a rhymed and colorful format common in children's books.

SUMMARY OF THE INVENTION

The utensil of the present invention, which can be a toothbrush, includes a handle that at one end includes a brush and in the middle forms a gripping element. To create a sporting theme, the gripping elements are shaped as sporting implements and are preferably of a ball configuration such as a spherical or elliptical shape. A plurality of such utensils are included as part of an instructional kit that further includes an instructional book for teaching the child dental health, a toothbrush stand for holding the toothbrushes and finger puppets attached to the stand that depict characters from the book.

To provide for an optimal gripping surface for the child's hand, the sporting implement formed in the handle of the toothbrush is positioned approximately equal distance from the ends of the handle to be aligned with the palm of the child's hand as it folds around the handle during brushing or use. Furthermore, each of the sporting implements is formed of a foam-rubber type substance and is of such a size and contour as to fit comfortably in the hand of a child and to provide a gripping surface. In the preferred embodiment, the sporting implement is of a ball configuration such as a spherical or elliptical shape such as a basketball, baseball, golf ball, soccer ball, tennis ball and football and has a length less than 3 inches and a circumference less than 5 inches. Other utensils, in addition to a toothbrush that may be included in the kit are a mirror and a stimulator tool, and a sporting implement may be formed near the middle of their handles as well.

The kit of the present invention includes an instructional book that instruct the child on dental health in a fanciful and graphic manner. The kit also includes a stand for hanging all of the toothbrushes. The stand being a flat plastic surface having holes for inserting the handles of the toothbrushes. The surface is supported by two fruit or vegetable-shaped legs which in the preferred embodiment are shaped like apples Finally, on each of the apple-shaped legs is a finger puppet removably attached to the apple-shaped legs. The finger puppets are fantasy animal characters that are used in the book to instruct children on good brushings habits.

There are various advantages to using the utensil designs and toothbrush kit of the present invention. Because the kit is fun for children to use, children will have a tendency to enjoy brushing, brush longer and become educated with respect to the important aspects of dental health. Because the children that use the present invention will practice better dental health, they will have healthier and cleaner teeth, mouth and gums. Another advantage is that the parents of the children that use the toothbrushing kit of the present invention will learn more about good dental health practices and can, therefore, more readily teach and instruct their children.

These and other objects of the present invention will become apparent from the following detailed description, the accompanying drawings and the appended claims.

BRIEF DESCRIPTION OF THE DRAWINGS

For a further understanding of the features and advantages of the present invention, reference should be made to the following detailed description taken in conjunction with the accompanying drawings in which like parts are given like reference numerals.

DETAILED DESCRIPTION OF THE PREFERRED EMBODIMENT

Figure 1:
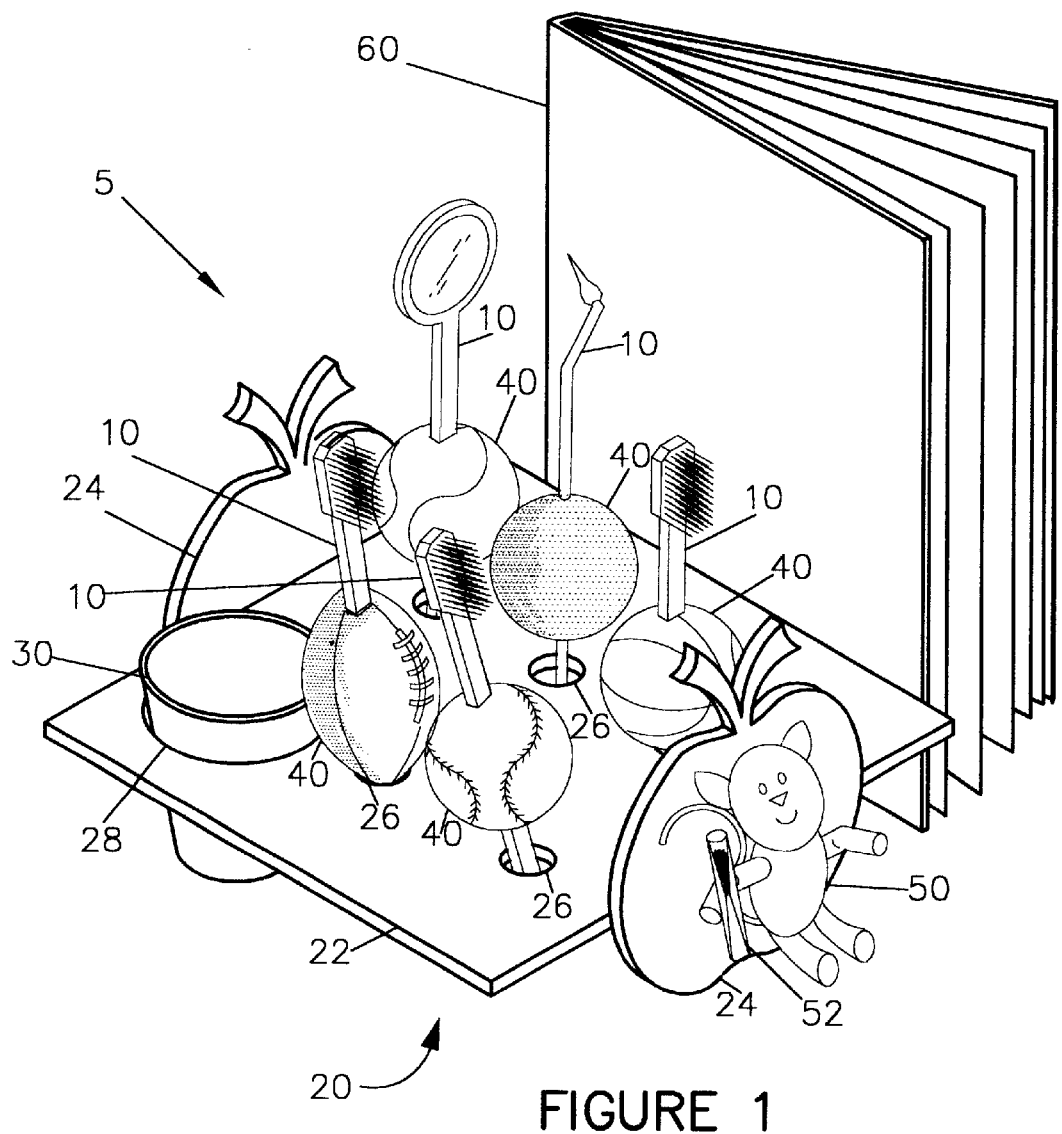
FIG. 1 is a perspective view of the toothbrushing kit of the present invention.
Figure 2:
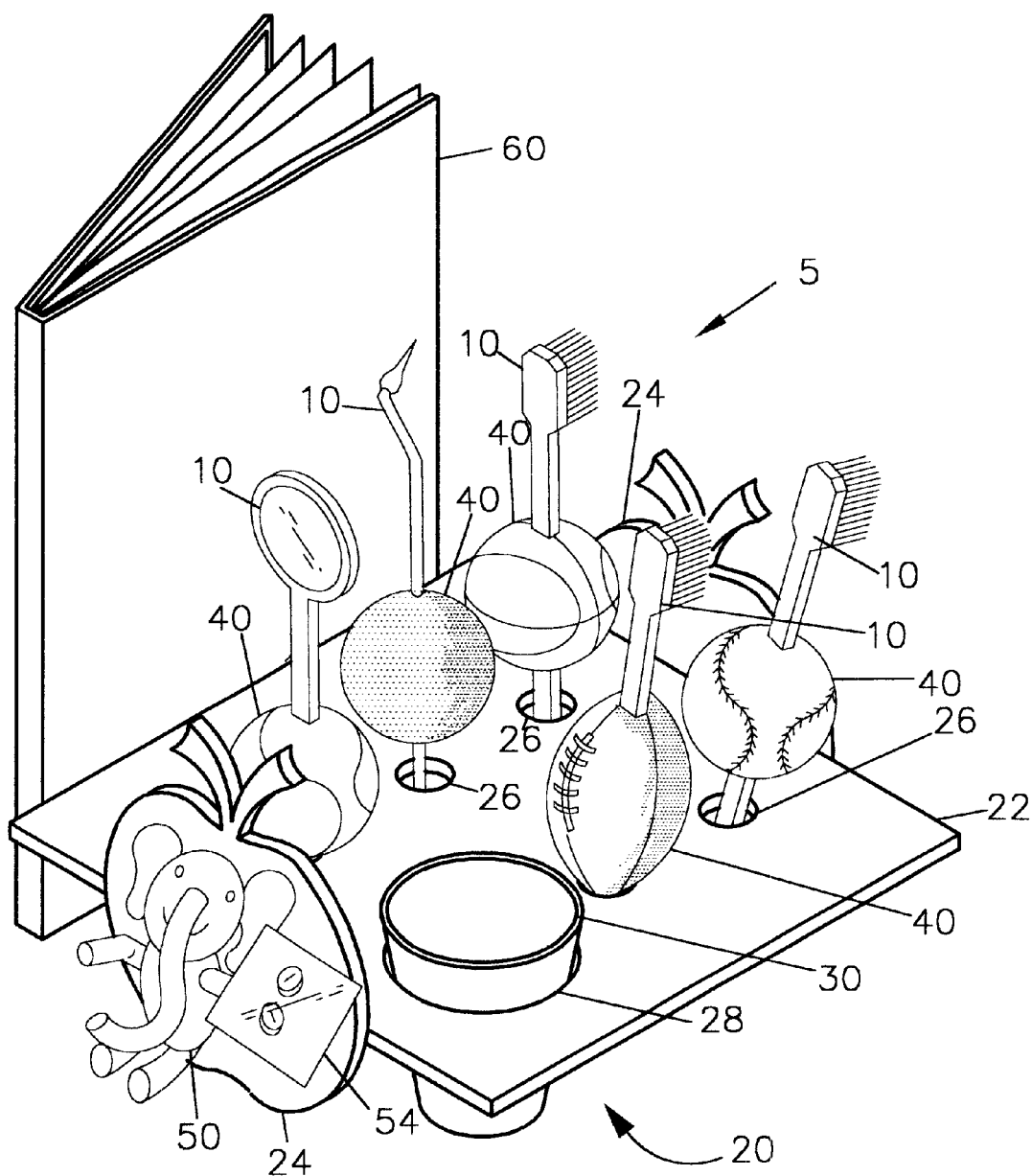
FIG. 2 is a second perspective view of the toothbrushing kit of the present invention.
Figure 4:
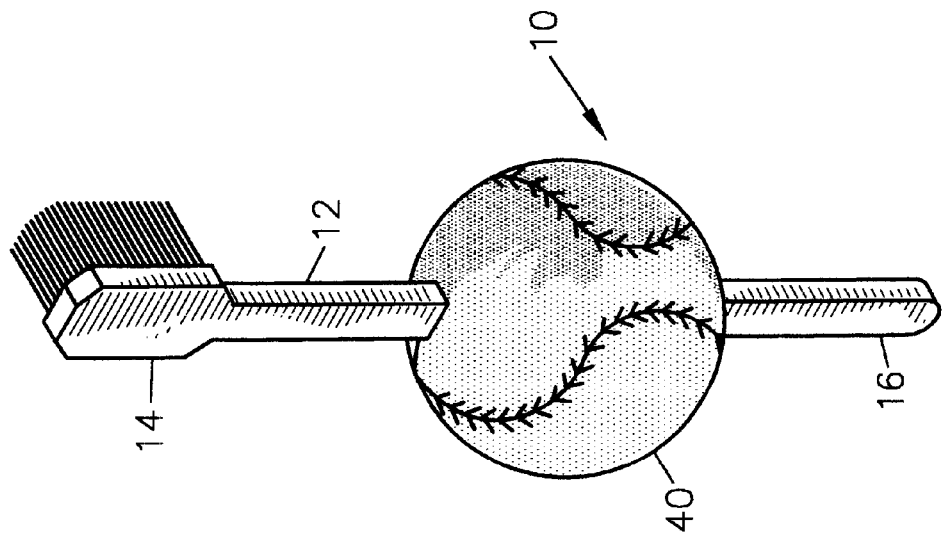
FIG. 4 is a perspective view of a second toothbrush having a gripping element in the handle in accordance with the present invention in the shape of a baseball.
Figure 3:
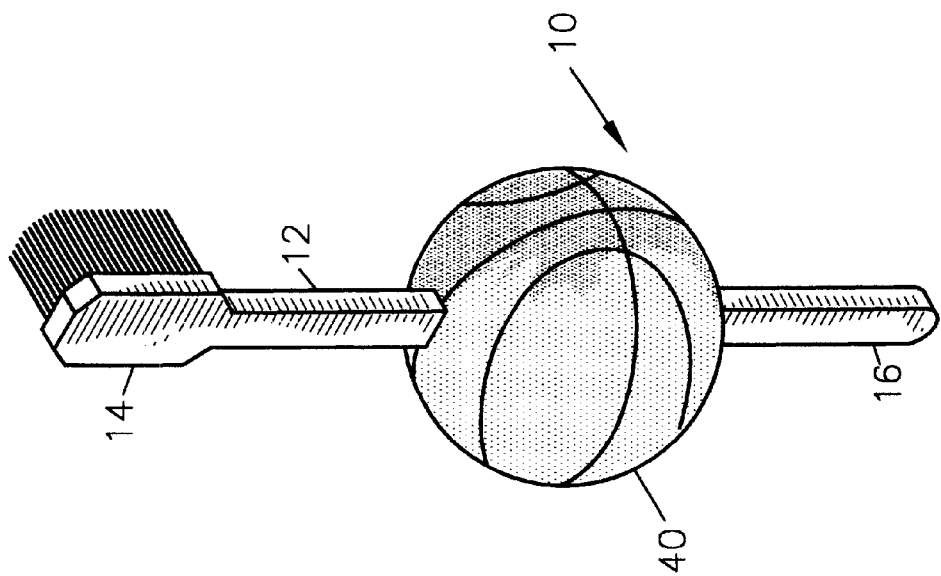
FIG. 3 is a perspective view of a first toothbrush having a gripping element in the handle in accordance with the present invention in the shape of a basketball.
Figure 6:
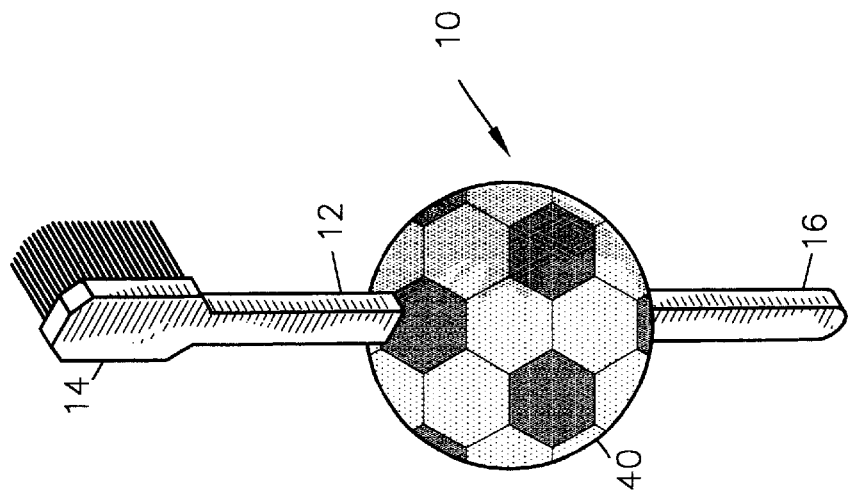
FIG. 6 is a perspective view of a fourth toothbrush having a gripping element in the handle in accordance with the present invention in the shape of a soccor ball.
Figure 5:
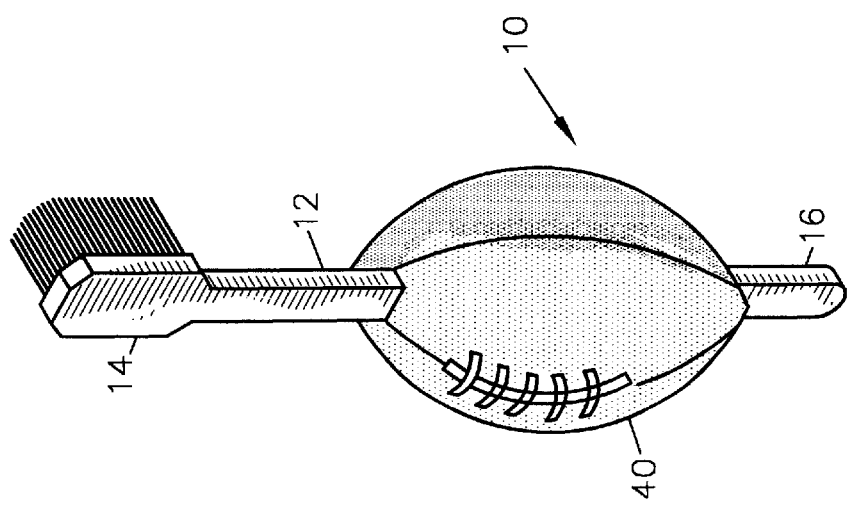
FIG. 5 is a perspective view of a third toothbrush having a gripping element in the handle in accordance with the present invention in the shape of a football.
Figure 8:
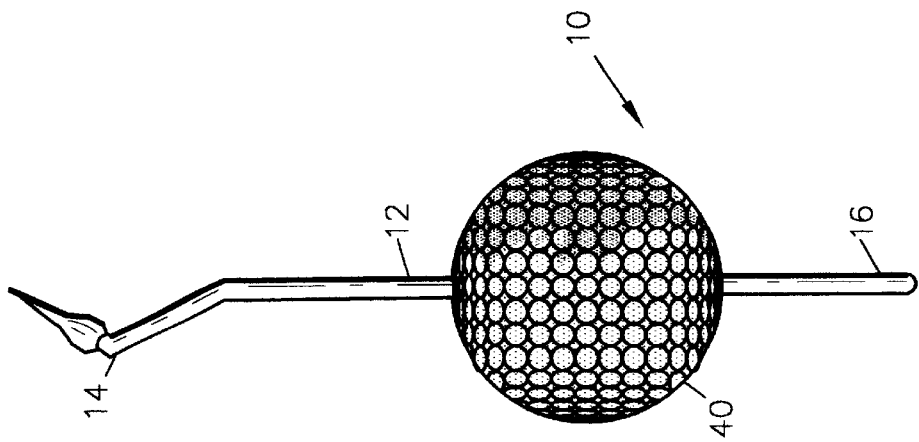
FIG. 8 is a perspective view of a stimulator tool in accordance with the present invention having a gripping element in the handle in accordance with the present invention in the shape of a golf ball.
Figure 7:
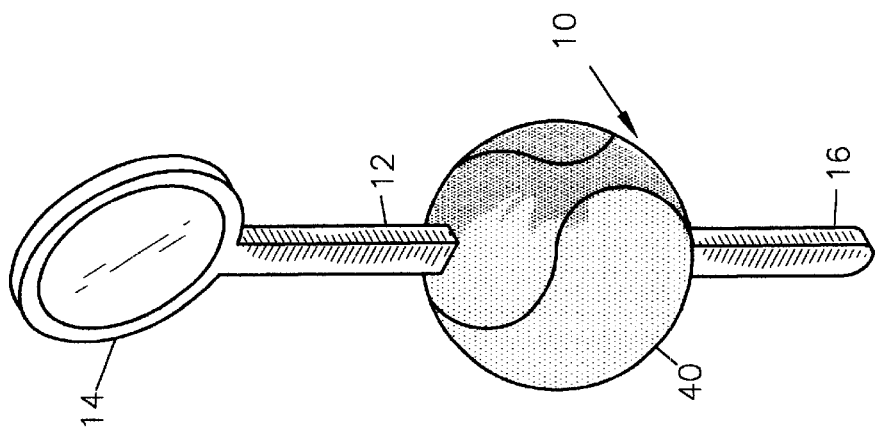
FIG. 7 is a perspective view of a mirror tool in accordance with the present invention having a gripping element in the handle in accordance with the present invention in the shape of a tennis ball.

Referring now to the drawings, FIGS. 1 and 2 illustrate the preferred embodiment of the toothbrushing kit 5 of the present invention. As shown in FIGS. 1 and 2, the kit 5 includes a plurality of utensils 10 placed in a toothbrush stand 20 for storing the utensils when not in use. The toothbrush stand 20 is made of a plastic-like material that is water resistant. The stand 20 includes a rectangular surface 22 having a set of tabs (not shown) at each end of the surface positioned in the middle of each edge for engaging a fruit or vegetable-shaped leg 24. The fruit or vegetable-shaped legs 24 serve to support the stand surface 22. In the preferred embodiment, the legs 24 are of an apple shape or could be in the shape of other fruits and vegetables that perform a detergent function on the teeth. Alternatively, the legs 24 could be of any shape that supports the stand 20 as described herein. Each apple-shaped leg 24 is made of the same plastic like materials as the stand surface 22 and includes two slots aligned for engaging the tabs on the edge of the stand surface.

At six positions in the stand surface 22 are located five holes 26 for inserting the utensils and a sixth hole 28 of significantly larger diameter for inserting a drinking cup 30. As to be further described, each utensil 10 has a gripping element 40 formed in its handle. The gripping element 40 of each utensil 10 serve to engage the surface of the stand 22 and hold the utensil 10 in place. This permits the utensil 10 to stay dry and avoid coming into contact with a dirty counter surface. In the preferred embodiment, the gripping elements 40 are in the shape of sporting implements. Although the sporting implements 40 may be of various sporting balls and equipment, in the preferred embodiment, the sporting implements include a basketball, baseball, golf ball, soccer ball, tennis ball and football. Similarly, the outer surface of the drinking cup 30 engages the surface of the stand 22 and holds the cup 30 in place.

On the face of each of the two apple-shaped legs 24 is a finger puppet 50 removably attached to the apple-shaped leg 24. The finger puppet 50 is in the shape of a fantasy animal character appealing to the child. In the preferred embodiment, the animals are an elephant and a mouse. As further described, the animal characters are included as illustrations throughout an instructional book 60 to teach the child the steps of proper dental health. In the hand of one finger puppet 50 may be an hourglass timer 52 to assist the child in timing the duration of the brushing and in the hand of the other finger puppet 50 is a packet of disclosing tablets 54. Disclosing tablets are used by the child to indicate parts of the teeth that have not been brushed and to indicate plaque build-up. In other variations, other dental hygiene aids can be attached to the hands of the finger puppets such as dental floss or toothpaste. Because the finger puppets 50 are removable, the child can also play with the finger puppets 50 between brushings adding to the child's interest in the brushing experience.

Finally, also included with the kit is an instructional book 60. The instructional book 60 is intended to be entertaining to the child and to be read by the child user of the toothbrush kit. The instructional book educates the child about proper dental health practices and teaches the child the various steps of proper dental health. The book 60 uses rhyme and graphics to communicate with the child in a format that is common in children's's books. The fantasy animal characters appear throughout the book 60 and are further characterized in the book 60 to provide dental health instruction in a way that is fun for the child.

As shown in FIGS. 3 through 8, each utensil 10 has a handle 12 that includes one end 14 having a dental hygiene implement such as a brush, mirror or picker. The other end 16 is free and typically is tapered down to a rounded end. The handle 12 is generally made of a plastic-like substance. The gripping elements 40 of the present invention are formed near the middle of the handle 12 of the utensils, approximately equal distance from the ends of the handle 12. The gripping elements 40 are contiguous with the handles 12 but are of a foamy rubber-like substance that is deformable and grippable for the child user. In the preferred embodiment, the gripping element 40 has a length less than 3 inches and a circumference less than 5 inches. In the preferred embodiment, the gripping element 40 is a sporting implement that is of a color similar to the real sporting ball. The toothbrushes are of standard brush-head design with plastic colorful handles.

Figure 9:
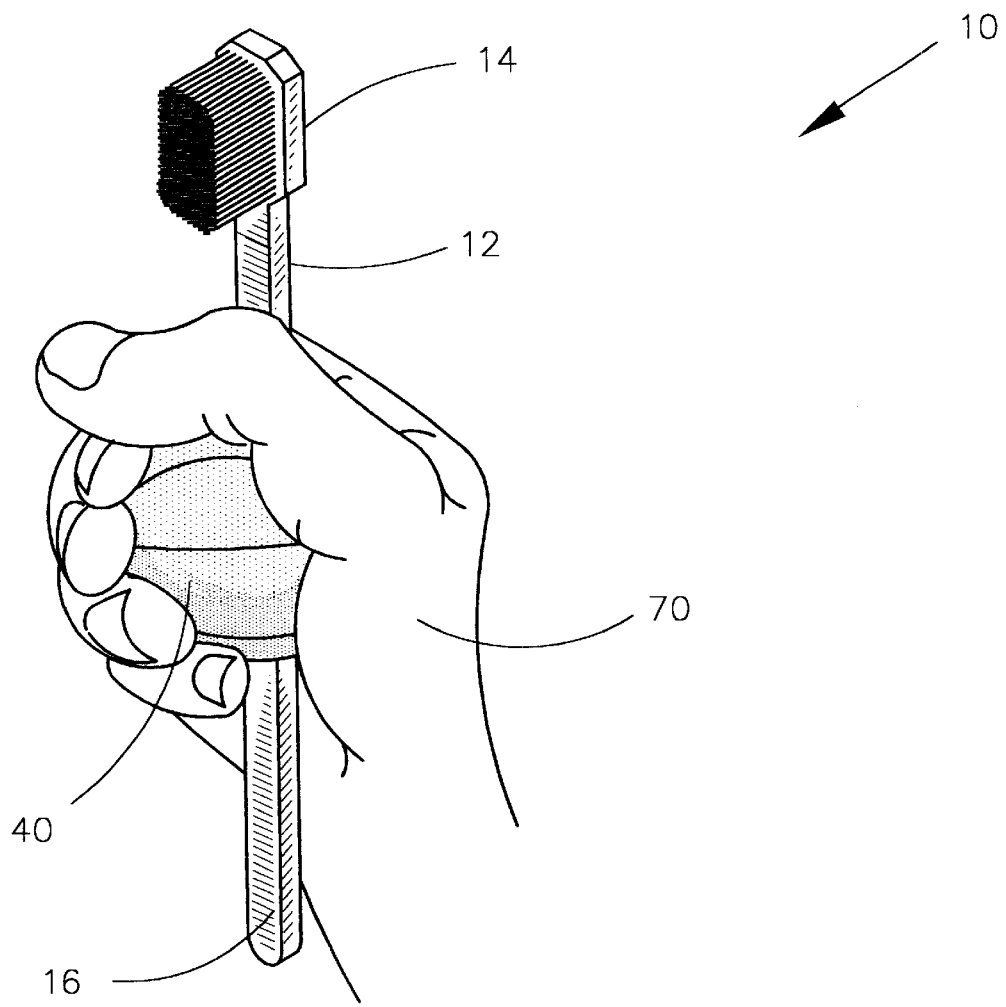
FIG. 9 is a perspective view of a toothbrush in accordance with the present invention with the handle being gripped in the palm of a child user.

In FIG. 9, a specifically designed toothbrush 10 in accordance with the present invention is shown gripped by a child user. As shown, the size and shape of the sporting implement 40 is designed to fit comfortably in a child's hand 70 as it grips the handle fitting the contour of the child's palm. This results in the toothbrush 10 resting comfortably in the child's hand 70. Because the handle 12 is grippable, the child will have a tendency to grip the toothbrushes and brush his or her teeth more effectively. Also, the texture of the sporting implements 40 will encourage the child to want to use the toothbrush more frequently and for longer durations.

Although a preferred embodiment of the invention has been illustrated in the accompanying Drawings and described in the foregoing Detailed Description of the Preferred Embodiment, it will be understood that the invention is not limited to the embodiment disclosed but is capable of numerous modifications without departing from the invention as claimed.

What is claimed is:

1. A dental utensil and instructional kit for use by young children comprising:

a plurality of dental utensils having elongated handles, each handle having a first end forming the tip of the handle and a second end forming a dental hygiene implement;

an enlarged portion formed in the handle of a deformable material and located approximately equal distance from the first end and the second end, the enlarged portion defining the shape of a gripping element, the gripping element sized and contoured to fit the shape of the young children's palm to enable young children to grip the dental utensil; and a stand having a flat surface supported by a plurality of legs attached to the flat surface, the flat surface having a plurality of holes for inserting the first end of the handles of the dental utensils, the flat surface engaging the gripping element to hold the dental utensils in place such that the dental hygiene implements are held in a position above the flat surface.

2. The dental utensil and instructional kit for use by young children of claim 1 wherein the gripping element is in the shape of a sporting implement.

3. The dental utensil and instructional kit for use by young children of claim 1 further comprising:
   a finger puppet depicting a fantasy animal character removably attached to each leg;
   at least one dental hygiene aid removably attached to the finger puppet;
   an instructional book to educate a young child user of the kit about dental health practices, the instructional book including illustrations of the fantasy animal character depicted by each finger puppet, the instructional book through rhyme and graphics educating the young child user of the proper use of the dental hygiene aids and utensils.

4. The dental utensil and instructional kit for use by young children of claim 2 wherein the sporting implement is in the shape of a basketball.

5. The dental utensil and instructional kit for use by young children of claim 2 wherein the sporting implement is in the shape of a football.

6. The dental utensil and instructional kit for use by young children of claim 2 wherein the sporting implement is in the shape of a soccer ball.

7. The dental utensil and instructional kit for use by young children of claim 2 wherein the sporting implement is in the shape of a tennis ball.

8. The dental utensil and instructional kit for use by young children of claim 2 wherein the sporting implement is in the shape of a golf ball.

9. The dental utensil and instructional kit for use by young children of claim 2 wherein the sporting implement is in the shape of a baseball.

10. The dental utensil and instructional kit for use by young children of claim 2 wherein the dental utensil is a mirror.

11. The dental utensil and instructional kit for use by young children of claim 2 wherein the dental utensil is a picker tool.

12. The dental utensil and instructional kit for use by young children of claim 2 wherein the legs are each in the shape of a fruit.

13. The dental utensil and instructional kit for use by young children of claim 2 wherein the legs are each in the shape of a vegetable.

14. The dental utensil and instructional kit for use by young children of claim 3 wherein at least one fantasy animal character is an elephant.

15. The dental utensil and instructional kit for use by young children of claim 3 wherein at least one fantasy animal character is a mouse.

16. The dental utensil and instructional kit for use by young children of claim 3 wherein the dental hygiene aid is an hourglass timer.

17. The dental utensil and instructional kit for use by young children of claim 3 wherein the dental hygiene aid is a package of disclosing tablets.

18. A toothbrush for use by young children comprising:
   a handle having a first end forming the tip of the handle and a second end forming a brush;
   an enlarged portion formed in the middle of the handle defining a gripping element, the gripping element in the shape of a sporting implement and of a size and contour to fit in the palm of young children.

19. The toothbrush of claim 18 wherein the sporting implement is in the shape of a basketball.

20. The toothbrush of claim 18 wherein the sporting implement is in the shape of a football.

21. The toothbrush of claim 18 wherein the sporting implement is in the shape of a soccer ball.

22. The toothbrush of claim 18 wherein the sporting implement is in the shape of a tennis ball.

23. The toothbrush of claim 18 wherein the sporting implement is in the shape of a golf ball.

24. The toothbrush of claim 18 wherein the sporting implement is in the shape of a baseball.

25. A dental utensil and instructional kit for use by young children comprising:
   a plurality of dental utensils having elongated handles, each handle having a first end forming a tip of the handle and a second end forming a dental hygiene implement;
   an enlarged portion formed in the handle of a deformable material and located approximately equal distance from the first end and the second end, the enlarged portion defining the shape of a sporting implement, the sporting implement sized and contoured to fit the shape of the young children's palm to enable young children to grip the dental utensil;
   a stand having a flat surface supported by a plurality of legs attached to the flat surface, the flat surface having a plurality of holes for inserting the first end of the handles of the dental utensils, the flat surface engaging the sporting implement to hold the dental utensils in place such that the dental hygiene implements are held in a position above the flat surface;
   a finger puppet depicting a fantasy animal character removably attached to each leg;
   at least one dental hygiene aid removably attached to the finger puppet; and
   an instructional book to educate a young child user of the kit about dental health practices, the instructional book including illustrations of the fantasy animal character depicted by each finger puppet, the instructional book through rhyme and graphics educating the young child user of the proper use of the dental hygiene aids and utensils.

26. The dental utensil and instructional kit of claim 25 wherein the flat surface of the stand further has at least one hole for inserting a cup, the flat surface engaging the surface of the cup to hold the cup in place.

* * * * *